United States Patent [19]

Cookson

[11] 4,415,763
[45] Nov. 15, 1983

[54] GAS-INSULATED TRANSMISSION LINE HAVING IMPROVED OUTER ENCLOSURE

[75] Inventor: Alan H. Cookson, Pittsburgh, Pa.

[73] Assignee: Westinghouse Electric Corp., Pittsburgh, Pa.

[21] Appl. No.: 349,568

[22] Filed: Feb. 17, 1982

Related U.S. Application Data

[62] Division of Ser. No. 206,917, Nov. 14, 1980, abandoned.

[51] Int. Cl.³ .......................... H02G 5/06; H01B 9/06
[52] U.S. Cl. ............................... 174/28; 174/106 R; 174/106 SC; 174/109
[58] Field of Search ............... 174/16 B, 27, 28, 99 B, 174/108, 109, 106 R, 106 SC

[56] References Cited

U.S. PATENT DOCUMENTS 4,092,485  5/1978  Wanser ................................ 174/28
4,095,040  6/1978  Cookson ............................. 174/28

FOREIGN PATENT DOCUMENTS 55-5085  1/1980  Japan .

Primary Examiner—Laramie E. Askin
Attorney, Agent, or Firm—M. S. Yatsko

[57] ABSTRACT

A gas-insulated transmission line includes an outer enclosure, an inner conductor insulatably supported within the outer conductor, and an insulating gas providing electrical insulation of the inner conductor. The outer enclosure includes a cylindrical insulating pipe or sheath with a separate electrostatic shield disposed on the sheath. The pressure containing function is separated from the electrostatic shielding function, thereby minimizing the use of the more expensive electrostatic shielding material for the pressure containing function.

3 Claims, 11 Drawing Figures

GAS-INSULATED TRANSMISSION LINE HAVING IMPROVED OUTER ENCLOSURE

This is a division of application Ser. No. 206,917, filed Nov. 14, 1980 now abandoned.

CROSS-REFERENCE TO RELATED APPLICATION

Reference is made to the following copending application by the same inventor as the instant application: "Gas-Insulated Power Transmission Line with Outer Enclosure of Carbon Steel and Aluminum", Ser. No. 206,919 filed Nov. 14, 1980, now U.S. Pat. No. 4,372,043.

BACKGROUND OF THE INVENTION

This invention relates generally to gas-insulated transmission lines, and more particularly to transmission lines having improved outer enclosures for containing the insulating gas.

Compressed gas-insulated transmission lines are a relatively recent commercial product which is gaining increased acceptance by the electric utility industry as an economical means for transmitting large blocks of electrical energy, and for use in special applications where conventional transmission lines are inadequate. A typical compressed gas-insulated transmission line is generally comprised of an elongated outer metallic sheath having disposed therein an inner conductor at high potential, with means disposed in the outer sheath to insulatably support the inner conductor within the outer sheath. An insulating gas, typical of which is sulfur hexafluoride at a pressure of 50 lbs/in$^2$ gauge, is utilized for electrically insulating the inner conductor from the outer sheath. The inner conductor is typically used to transmit energy at voltage ranges from 121–1200 KV. Both the inner conductor and the outer sheath are of good electrically conducting materials such as aluminum.

One of the drawbacks of gas-insulated power transmission lines which is hindering even more widespread applications of the lines is associated with the cost of the lines. One of the more costly components of the transmission lines is the outer enclosure utilized to contain the inner conductor and the insulating gas.

Present gas-insulated transmission lines utilize a solid enclosure of aluminum to contain the inner conductor and the insulating gas. Aluminum is preferred because of the low electrical losses. However, the aluminum material utilized for the enclosure is itself expensive, and large quantities of the material must be utilized.

One method attempted in the prior art to minimize the cost of the outer enclosure has been to utilize carbon steel as the outer enclosure. Although carbon steel pipe is generally readily available at less expensive costs than aluminum, the losses which occur due to eddy currents are substantial. Therefore, because of the high losses occurring therein, the use of carbon steel for the outer enclosure has generally occurred only when the current rating of the line is very low and the high electrical losses are acceptable.

Another method attempted in the prior art is the use of an intercalated outer sheath, as specified, for example, in U.S. Pat. No. 4,095,040. This intercalated sheath utilized an insulating former which had wrapped around it overlapped layers of aluminum foil, both on the interior and exterior surfaces of the insulating casing.

SUMMARY OF THE INVENTION

The above-mentioned disadvantage of the prior art is overcome by this invention which, in one embodiment, provides a gas-insulated transmission line including a non-metallic, cylindrical pressure pipe having disposed therein a thin-walled, corrugated, cylindrical grounded, electrically conducting tube. An inner conductor is insulatably supported within the tube, and a pressurized insulating gas fills the interior of the pressure pipe.

Another embodiment of the invention utilizes a tubular, hollow insulating outer sheath having disposed thereon a material layer of either an electrically conducting or semiconducting material. The material layer is disposed either on the interior surface or the exterior surface of the outer sheath, and may include an electrically conducting foil wrapped around the exterior surface of the sheath and the material layer.

A further embodiment of the invention provides a gas-insulated transmission line where the outer enclosure includes a hollow insulating tube and an electrically conducting sheet material wound on the tube in an overlapping layered relationship, with an electrically insulating sheet material disposed between overlapped layers of the conducting material and an adhesive securing the insulating material to the conducting material.

A still further embodiment provides an elongated, solid, electrically insulating outer casing having a longitudinal opening therethrough, with a non-metallic, elongated tubular pipe disposed in this opening. The inner conductor and the insulating gas are then disposed in the non-metallic hollow pipe.

BRIEF DESCRIPTION OF THE DRAWINGS

Reference is now made to the description of the preferred embodiment, illustrated in the accompanying drawings, in which.

DESCRIPTION OF THE PREFERRED EMBODIMENTS

Figure 1:
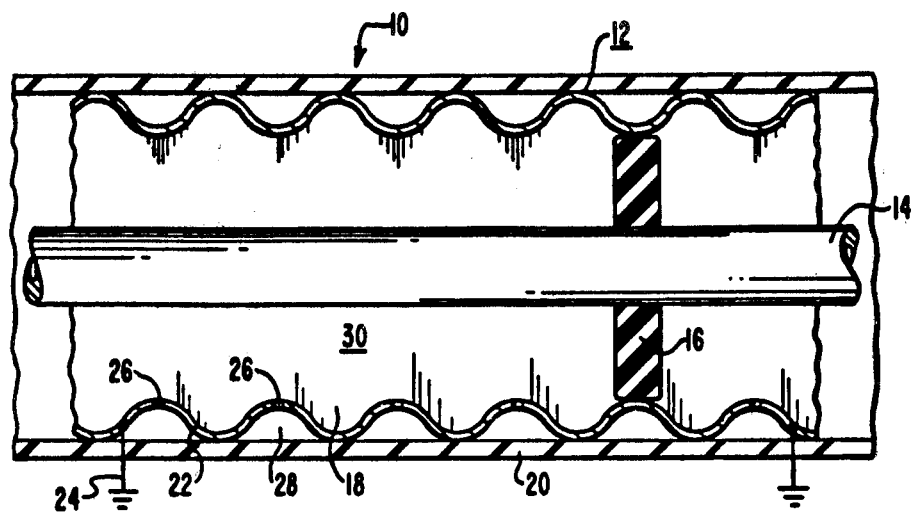
FIG. 1 is an illustration, partly in section and partly in elevation, of a gas-insulated transmission line according to the teachings of this invention.

Referring now more particularly to FIG. 1, therein is illustrated a compressed gas-insulated transmission line 10, according to one of the teachings of this invention. The transmission line 10 is comprised of an outer enclosure 12 having disposed therein an inner conductor 14 which would be at high potential such as 121–1200 KV line-to-line voltage and which conducts an electric current. Insulatably supporting the inner conductor 14 within the outer enclosure 12 is an insulating support 16, a plurality of which would typically be utilized at spaced intervals along the length of the transmission line 10. Disposed within the outer enclosure 12 is an electrically insulating gas 18, typical of which is sulfur hexafluoride at a pressure of 50 lbs/in$^2$ gauge.

The outer enclosure 12 is comprised of a gas-tight, non-metallic, cylindrical hollow pressure pipe 20 and a thin-walled, corrugated, cylindrical, single-point grounded, electrically conducting tube 22 disposed within the pressure pipe 20. The electrically conducting tube 22 would, for example, be made of aluminum.

The electrically conducting tube 22 is not necessarily gas-tight, for the tube 22 does not function as a pressure container for the insulating gas 18. Rather, the pressure pipe 20 functions as a gas-tight pressure enclosure enclosing the insulating gas 18, and the purpose of the tube 22 is to provide an electrostatic shield. In order to reduce the losses in the tube 22, it is singlepoint grounded as at 24. Alternatively, if desired, the aluminum tube 22 may be cross-bonded to similar tubes of other phases of the gas-insulated transmission line.

As described above, the pressure pipe 20 is a gas-tight, non-metallic tube which functions as the pressure enclosure for containing the insulating gas 18. Cost economies are achieved by the elimination of the more-expensive thick aluminum outer sheath previously utilized in the prior art. The pressure pipe 20 may, for example, be made of non-metallic materials such as polyethylene, fiberboard, fiberglass, polycarbonate or polyvinylchloride.

Because the tube 22 is not utilized for containing the insulating gas 18, there is no necessity that the tube 22 be gas-tight. Indeed, it may be advantageous to provide a plurality of apertures 26 in the form of holes or slots in the tube 22. These openings 26 would enable any contamination particles present within the insulating gas 18 in the region 30 between the inner connector 14 and the tube 22 to enter the very low field region 28 which exists between the tube 22 and the pressure pipe 20. Once the contamination particles enter this low field region 28, there would not be sufficient electric force exerted upon them to lift them back into the region 30 between the inner conductor 14 and the tube 22 where they may initiate flashover or breakdown.

Figure 2:
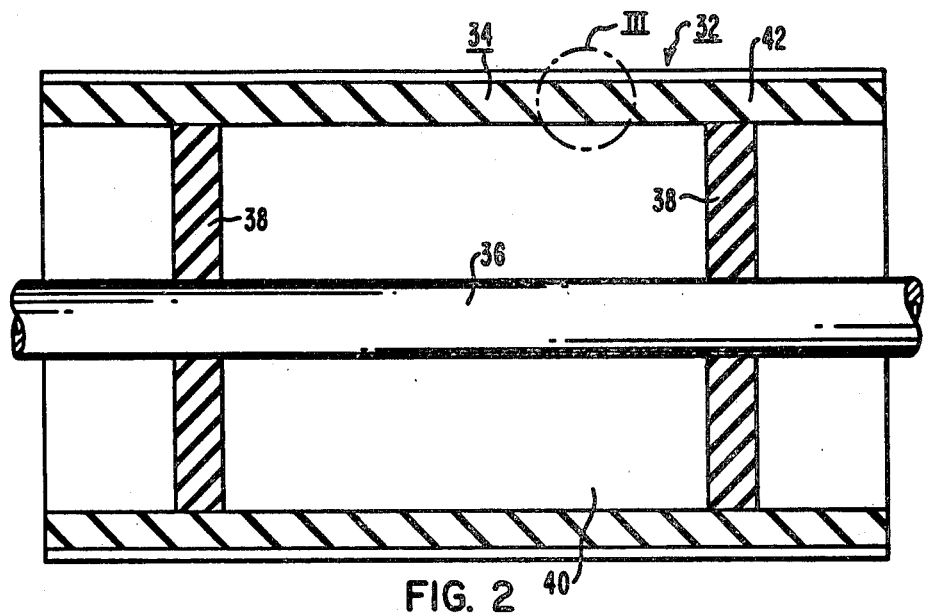
FIG. 2 illustrates, partly in section and partly in elevation, a gas-insulated transmission line utilizing a modified outer enclosure.

Referring now more particularly to FIG. 2, therein is illustrated another gas-insulated transmission line 32 illustrating a modified outer enclosure 34 useful in lowering the costs of the transmission line 32. In the modification illustrated in FIGS. 2 and 3, the inner conductor 36 is disposed within the outer enclosure 34 and is insulatably supported therein by a plurality of insulating supports 38, spaced at intervals along the transmission line 32. The insulating gas 40 is utilized for electrically insulating the inner conductor 36 from the outer enclosure 34. In the modification illustrated in FIGS. 2 and 3, the outer enclosure 34 comprises a hollow insulating tube 42 made of a material such as polyethylene, fiberboard, fiberglass, polycarbonate or polyvinylchloride, with an electrically conducting sheet material 44 wound on the exterior surface 43 of the tube 42 in an overlapping layered relationship between adjacent turns 48, 50. An electrically insulating sheet material 46 is disposed between overlapped layers, for example at 48, 50, of the conducting sheet material 44. An adhesive material 52 is utilized for securing the insulating material 46 to the conducting material 44. The adhesive material 52 could be disposed either on the insulating sheet material 46, the electrical conducting sheet material 44, or, as illustrated, on both materials 44, 46.

Figure 3:
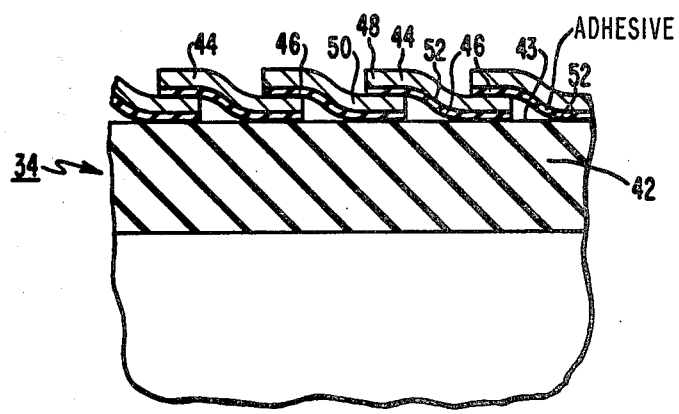
FIG. 3 is a detailed view of a section of the outer enclosure illustrated in FIG. 2 as indicated by the circle III in FIG. 2.
Figure 4:
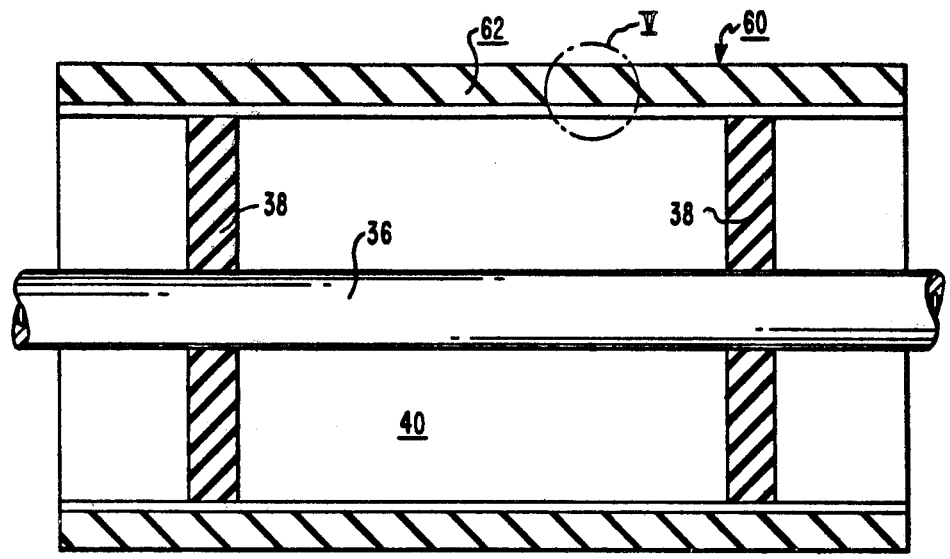
FIG. 4 illustrates a modification to the outer enclosure illustrated in FIG. 2.
Figure 5:
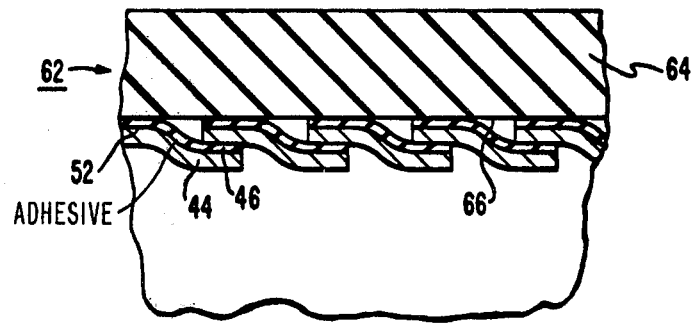
FIG. 5 is a detailed view of a portion of the outer enclosure illustrated in FIG. 4 as indicated by the circle V in FIG. 4.

Referring now to FIGS. 4 and 5, therein is illustrated a modified transmission line 60 having a modified outer enclosure 62 from that illustrated in FIGS. 2 and 3. In this modification, the outer enclosure 62 comprises a hollow insulating tube 64 similar to the insulating tube 42 in FIG. 2. Additionally, the electrically conducting sheet material 44, the electrically insulating sheet material 46, and the adhesive material 52 are as illustrated in FIGS. 2 and 3. However, in this modification, the conducting material 44, the insulating material 46 and the adhesive 52 are wound about the interior surface 66 of the tube 64, as distinguished from that illustrated in FIGS. 2 and 3, where the conducting material 44, insulating material 46 and adhesive 52 were wound on the exterior surface 43 of the tube 42. Otherwise, except for this change in location with respect to the hollow insulating pressure tube 42 or 64, the construction of the two transmission lines 32, 60 are similar. In both modifications, the electrically conducting sheet material is preferably an aluminum foil or stainless steel foil, and the electrically insulating material 46 is a good insulating material such as polyethylene or polypropylene.

Figure 6:
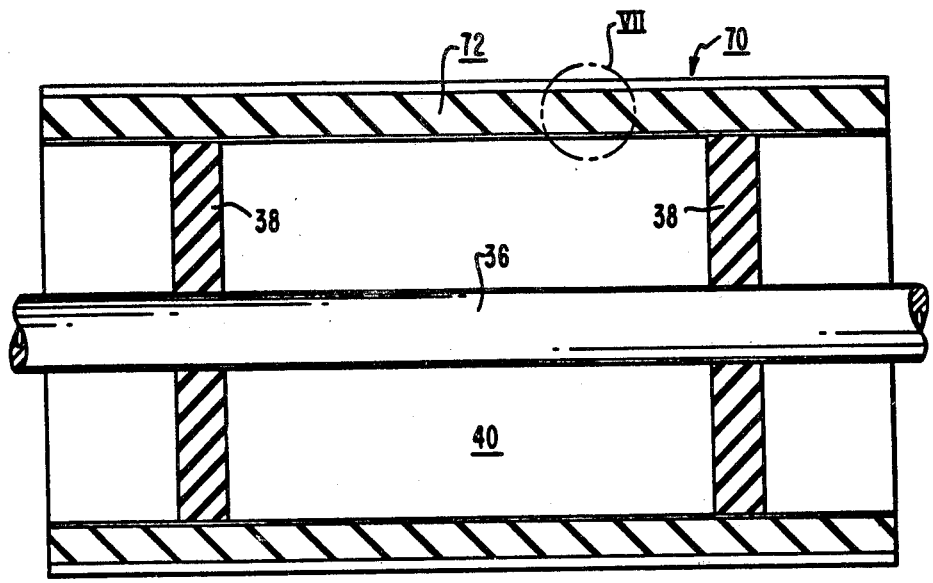
FIG. 6 illustrates a modification to the outer enclosure of the transmission line shown in FIG. 2.
Figure 7:
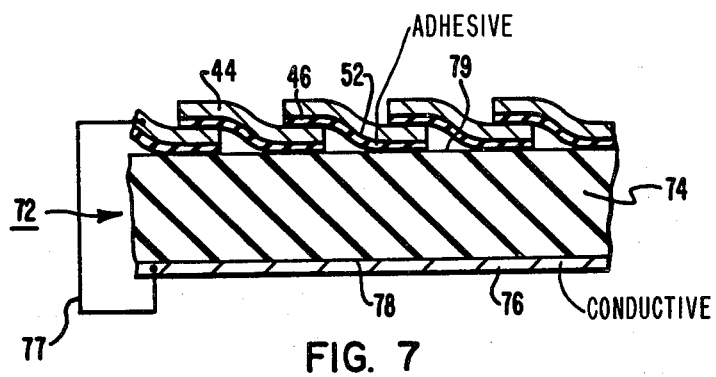
FIG. 7 is a detailed view of a portion of the outer enclosure illustrated in FIG. 6 as indicated by the circle VII in FIG. 6.

Referring now to FIGS. 6–9, therein are illustrated two further modifications of the transmission lines illustrated in FIGS. 2–5. In FIGS. 6 and 7, the transmission line 70 is similar to that described heretofore, with the outer enclosure 72 including a tubular hollow insulating outer sheath 74 made of a material such as polyethylene, fiberboard, fiberglass, polycarbonate, or polyvinylchloride. In this modification, though, a material layer 76 is disposed all along the interior surface 78 of the outer sheath 74. The material layer 76 can be of either an electrically conducting material or an electrically semiconducting material. The electrically conducting or semiconducting material layer 76 functions to provide an electrostatic shield whereas the outer sheath 74 itself functions as the pressure enclosure to contain the insulating gas 40.

If desired an electrically conducting foil 44 such as that illustrated in FIGS. 2–5, may be wrapped around the exterior surface 79 of the outer sheath 74. Means 77, such as a connecting wire, then would be utilized to electrically connect the material layer 76 to the electrically conducting foil 44. By so utilizing the exteriorly wrapped foil 44, the capacitive return currents could be carried by the foil 44 without having any electrical stresses occurring in the non-metallic, insulating outer sheath 74.

Figure 8:
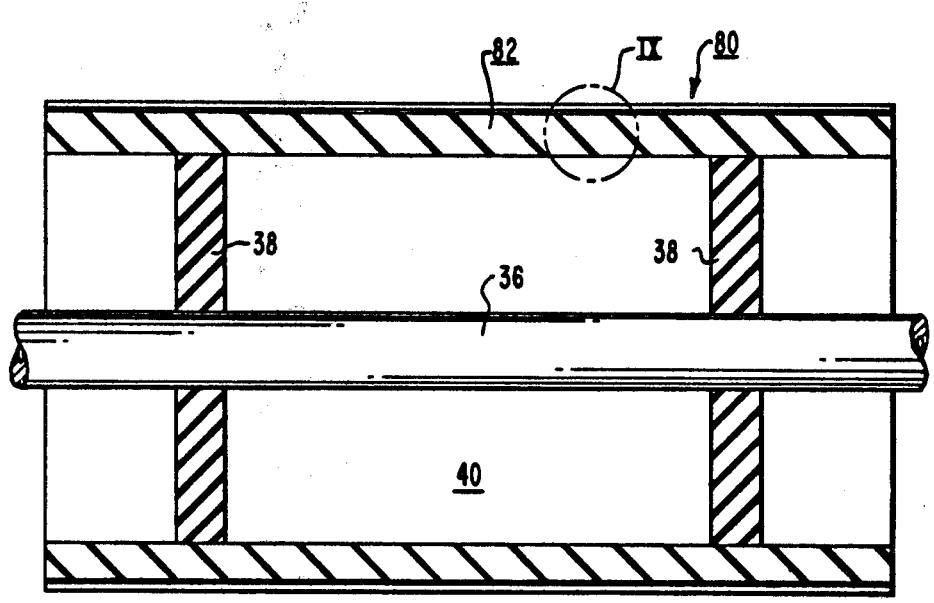
FIG. 8 illustrates a modification to the outer enclosure of the transmission line illustrated in FIG. 2.
Figure 9:
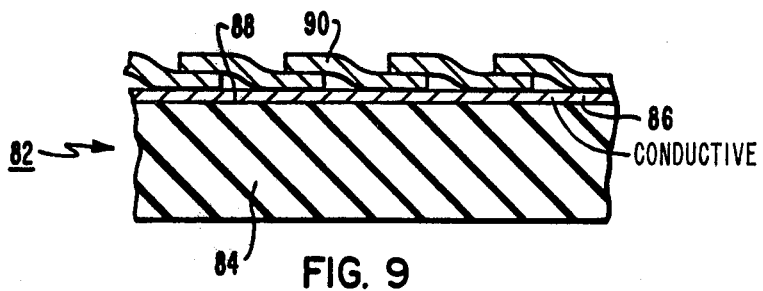
FIG. 9 is a detailed view of a portion of the outer enclosure illustrated in FIG. 8 as indicated by the circle IX in FIG. 8.

Referring now to FIGS. 8 and 9, the transmission line 80 has an outer enclosure 82 which is comprised of a tubular, hollow insulating outer sheath 84 similar to the outer sheath 74 illustrated in FIGS. 6 and 7, but in this modification, the material layer 86 is disposed on the exterior surface 88 of the outer sheath 84. Again, the material layer 86 can be of either an electrically conducting material or an electrically semiconducting material. In this modification, an electrically conducting foil 90 is wrapped around the exterior surface of the outer sheath 84 and the material layer 86, with the conducting foil 90 electrically contacting the material layer 86.

Figure 10:
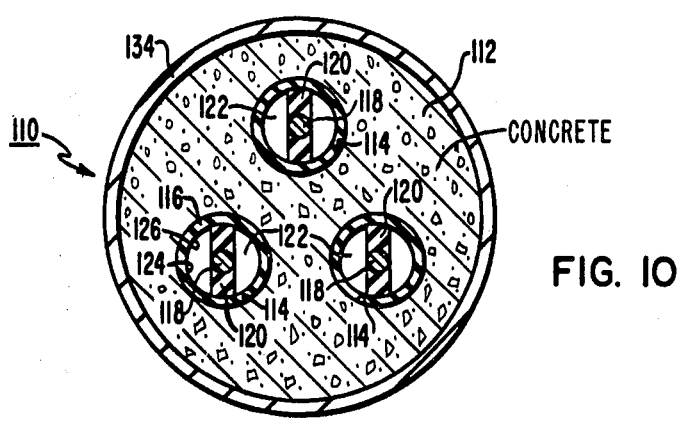
FIGS. 10 and 11 illustrate further modifications to the transmission line illustrated in FIG. 2.
Figure 11:
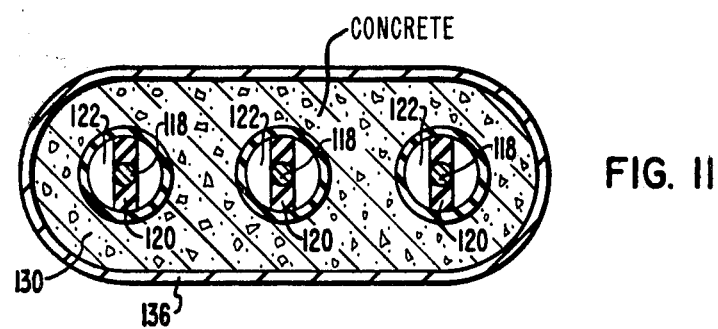

Referring now to FIGS. 10 and 11, there is illustrated still another modification to the outer enclosure utilized in the gas-insulated transmission line. In the modification shown in FIG. 10, the transmission line 110 is comprised of an elongated, solid, electrically insulating outer casing 112 having one or more longitudinal openings 114 therethrough. Disposed within each longitudinal opening 114 is a non-metallic, elongated tubular hollow pipe 116, with the outer casing 112 providing pressure reinforcement for the hollow pipe 116. An inner conductor 118 is insulatably supported, by means such as the supports 120 in the pipe 116, and an insulating gas 122 is utilized for electrically insulating the inner conductor 118. If desired, an electrostatic shield 124 may be disposed on the interior surface 126 of the pipe 116. The electrostatic shield 124 could comprise, for example, either an electrically conducting or semiconducting material layer such as that illustrated in FIGS. 6 and 7.

The outer casing 112 functions to provide a pressure enclosure for the insulating gas 122 disposed within the hollow pipe 116, and could be made, for example, from concrete or polymer-impregnated concrete. The casing 122 can have either a single longitudinally extending opening 114 therethrough, or, as illustrated in FIGS. 10 and 11, could have a plurality such as three openings therethrough, so as to provide an integrated three-phase transmission line. The casing 112 could be of circular cross-section as illustrated in FIG. 10, or could be of the elliptical cross-section 130 illustrated in FIG. 11. The elliptical cross-section may be desirable in that, with this configuration, less material is utilized for constructing the outer casing 130.

An alternative design is to not have an electrostatic shield 124 in each phase, but to use the nonmetallic sheath 116 and the insulating casing 112. In this case, the sheath 116 and the casing 112 would be electrically stressed, as would be the soil at the interface with the casing 112. To prevent discharges possibly occurring at the soil interface, and for personnel safety, a metallic electrostatic shield 134 or 136 could be used.

As can be seen, the various embodiments of this invention, which separate the pressure containing function from the electrostatic shielding function for the outer enclosure of the transmission line, provide a means for constructing a transmission line which utilizes less expensive materials for the outer enclosures, thereby minimizing the costs of the transmission line.

I claim:

1. A gas-insulated transmission line comprising:
a tubular hollow insulating outer sheath;
an electrically conducting material layer disposed on the exterior surface of said outer sheath;
an electrically conducting foil wrapped around the exterior surface of said outer sheath and said material layer;
an inner conductor insulatably supported within said outer sheath; and
an insulating gas disposed within said outer sheath.

2. A gas-insulated transmission line comprising:
a tubular hollow insulating outer sheath;
an electrically semiconducting material layer disposed on the exterior surface of said outer sheath;
an electrically conducting foil wrapped around the exterior surface of said outer sheath and said material layer;
an inner conductor insulatably supported within said outer sheath; and
an insulating gas disposed within said outer sheath.

3. The transmission line according to claim 1 or 2 wherein said outer sheath is made of polyethylene, fiberboard, fiberglass, polycarbonate or polyvinylchloride.

* * * * *